(12) United States Patent
Hsieh et al.

(10) Patent No.: US 9,353,272 B2
(45) Date of Patent: May 31, 2016

(54) ORGANIC DISPERSION, METHOD FOR PREPARING THE SAME, AND COATING COMPOSITION PREPARED FROM THE SAME

(71) Applicant: Industrial Technology Research Institute, Hsinchu (TW)

(72) Inventors: Meng-Ting Hsieh, Hsinchu (TW); Chun-Wei Su, Hsinchu (TW); Chyi-Ming Leu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 13/861,214

(22) Filed: Apr. 11, 2013

(65) Prior Publication Data

US 2014/0163147 A1 Jun. 12, 2014

(30) Foreign Application Priority Data

Dec. 7, 2012 (TW) .............................. 101146032 A

(51) Int. Cl.
*C09D 127/16* (2006.01)
*C09D 7/12* (2006.01)

(52) U.S. Cl.
CPC ............ *C09D 7/1225* (2013.01); *C09D 127/16* (2013.01)

(58) Field of Classification Search
USPC .......................................... 524/263, 261, 81
See application file for complete search history.

(56) References Cited

U.S. PATENT DOCUMENTS

| | | | |
|---|---|---|---|
| 5,759,643 A * | 6/1998 | Miyashita et al. ............ 428/1.31 |
| 5,783,299 A * | 7/1998 | Miyashita et al. ............ 428/329 |
| 6,841,211 B1 * | 1/2005 | Knoll et al. ................... 428/34.5 |
| 7,495,049 B2 | 2/2009 | Lee | |
| 7,989,535 B2 * | 8/2011 | Nakagawa et al. ........... 524/445 |
| 8,652,430 B2 * | 2/2014 | Yang et al. .................... 423/265 |
| 2007/0172640 A1 * | 7/2007 | Tahara et al. ............... 428/319.1 |
| 2009/0106236 A1 | 4/2009 | Koefoot et al. | |
| 2010/0015379 A1 | 1/2010 | Matsushita | |
| 2010/0067172 A1 * | 3/2010 | Zhang .................... C08L 25/06 361/323 |
| 2010/0215894 A1 | 8/2010 | Iverson et al. | |
| 2011/0013343 A1 | 1/2011 | Koh et al. | |
| 2011/0118393 A1 * | 5/2011 | Yen ........................ B82Y 30/00 524/104 |
| 2012/0045603 A1 | 2/2012 | Zerafati et al. | |

FOREIGN PATENT DOCUMENTS

| | | |
|---|---|---|
| CN | 101258560 | 9/2008 |
| CN | 101294971 | 10/2008 |
| CN | 101616800 | 12/2009 |
| CN | 101646725 | 2/2010 |
| CN | 101978446 A | 2/2011 |
| CN | 102532756 A | 7/2012 |
| CN | 102532956 A | 7/2012 |
| JP | 11302561 | 11/1999 |
| JP | 2007214107 | 8/2007 |
| JP | 2008200983 | 9/2008 |
| TW | 586248 | 12/2002 |
| TW | 200846177 | 12/2008 |
| TW | 201029848 A1 | 8/2010 |
| TW | I344433 | 7/2011 |
| WO | WO 2008102907 | 8/2008 |

OTHER PUBLICATIONS

T. Ohtsuka et al., "Synthesis of transparent poly(vinylidene fluoride) (PVdF)/zirconium oxide hybrids without crystalliation of PVdF chains," Polymer 50, (2009), pp. 3174-3181.
T. Ogoshi et al., "Synthesis of Poly(vinylidene fluoride) (PVdF)/Silica Hybrids Having Interpenetrating Polymer Network Structure by Using Cystallization between PVdF Chains," Journal of Polymer Science: Part A: Polymer Chemistry, vol. 43, (2005), pp. 3543-3550.
P. Wang et al., "Enhanced Separation Performance of PVDF/PVP-g-MMT Nanocomposite Ultrafiltration Membrane Based on the NVP-Grafted Polymerization Modification of Montmorillonite (MMT)," ACS Publications, Langmuir, (2012), 28, pp. 4776-4786.
F. Liu et al., "Preparation and characterization of poly(vinylidene fluoride) (PVDF) based ultrafiltration membranes using nana $\gamma\text{-}Al_2O_3$," Journal of Membrane Science 366, (2011), pp. 97-103.
T. Umasankar et al., "Studies on poly(vinylidene fluoride)-clay nanocomposites: Effect of different clay modifiers," Polymer 49, (2008), pp. 3486-3499.
D. Nagao et al., "Fabrication of highly refractive, transparent $BaTiO_3$/poly(methyl methacrylate) composite films with high permittivities," Polym Int, (2011), 60, pp. 1180-1184.

* cited by examiner

*Primary Examiner* — Peter D Mulcahy
*Assistant Examiner* — Henry Hu
(74) *Attorney, Agent, or Firm* — Muncy, Geissler, Olds & Lowe, P.C.

(57) ABSTRACT

An organic dispersion is provided. The organic dispersion includes an organic solvent, and an inorganic nano sheet material modified by a fluoro-containing modifier and dispersed in the organic solvent, wherein the inorganic nano sheet material is in a size from 20 to 80 nm, and the organic dispersion has a solid content from 1 to 20 wt %. Further, a weight ratio of the fluoro-containing modifier in the inorganic nano sheet material to the inorganic nano sheet material is in a range from 0.06 to 1.5.

3 Claims, No Drawings

ORGANIC DISPERSION, METHOD FOR PREPARING THE SAME, AND COATING COMPOSITION PREPARED FROM THE SAME

CROSS-REFERENCE TO RELATED APPLICATIONS

This application claims priority to Taiwanese Patent Application No. 101146032, filed on Dec. 7, 2012. The entirety of the above-mentioned patent application is hereby incorporated by reference herein and made a part of this specification.

TECHNICAL FIELD

The present disclosure relates to an organic dispersion, a method for preparing the same, and a coating composition prepared from the same.

BACKGROUND

Fluoropolymers, such as poly(vinylidene) fluoride (PVDF), have excellent strengths, robustness and rigidity, and outstanding chemical stability. Moreover, fluoropolymers have good dielectric constants and contact angles of about 90 degrees, such that they are suitable to be used as protective layers and insulating layers.

Usually, polymers easily age under irradiation of ultraviolet rays, and are prone to have reduced lives as they are exposed to heat and contaminants. By the addition of a UV absorber, a UV stabilizer or an inorganic particle, the life of a polymer can be extended. In a composite material product, inorganic particles (such as $BaTiO_3$ or $TiO_2$) with a high dielectric constant, a fluoropolymer and a solvent are mixed to increase the dielectric property of the blended material. However, the transmittance of the composite material is yet to be improved.

On the other hand, if a transparent non-crystalline polymer (such as PMMA and PEO) and a fluoropolymer are mixed to form a composite material. Although the optical property of the composite material is improved, the dielectric property of the composite material is significantly decreased as the proportion of the transparent non-crystalline polymer added is increased. Moreover, there are also reports on the addition of a polymer (such as PS or PPO) with a higher resistance and a lower dielectric loss for increasing the dielectric strength, rather than optical characteristics, of a composite material.

It is an important issue to develop a coating layer based on a fluoropolymer with high a transmittance.

SUMMARY

The present disclosure provides an organic dispersion, including an organic solvent; and an inorganic nano sheet material modified by a fluoro-containing modifier and dispersed in the organic solvent, wherein the inorganic nano sheet material is in a size of from 20 to 80 nm, and the organic dispersion has a solid content of from 1 to 20 wt %. Further, a weight ratio of the fluoro-containing modifier in the inorganic nano sheet material to the inorganic nano sheet material is in a range from 0.06 to 1.5.

The present disclosure further provides a method for preparing an organic dispersion, including the steps of: (a) dispersing an inorganic nano sheet material in water, to form an aqueous dispersion; (b) treating the aqueous dispersion with an ion-exchange resin, so as for the inorganic nano sheet material to be ion-exchanged to obtain an aqueous dispersion of a $H^+$-type inorganic nano sheet material; (c) adding a fluoro-containing modifier to the aqueous dispersion of the $H^+$-type inorganic nano sheet material, to modify the inorganic nano sheet material; (d) adding a first organic solvent and a second organic solvent to the aqueous dispersion containing the fluoro-containing modifier; and (e) removing the first organic solvent and water, to disperse a modified inorganic nano sheet material in the second solvent to form the organic dispersion, wherein the organic dispersion has a solid content from 1 to 20 wt %, and a weight ratio of the fluoro-containing modifier in the inorganic nano sheet material to the inorganic nano sheet material is in a range from 0.06 to 1.5.

The present disclosure further provides a coating composition containing a mixed organic/inorganic material, including 3 to 45 weight parts of an inorganic nano sheet material modified by a fluoro-containing modifier and dispersed in a fluoropolymer, based on 100 parts of the fluoropolymer, wherein the inorganic nano sheet material is in a size from 20 to 80 nm, and a weight ratio of the fluoro-containing modifier in the inorganic nano sheet material to the inorganic nano sheet material is in a range from 0.06 to 1.5.

DETAILED DESCRIPTION

In the following, specific embodiments are provided to illustrate the detailed description of the present disclosure. Those skilled in the art can easily conceive the other advantages and effects of the present disclosure, based on the specification.

The present disclosure provides an organic dispersion, which includes an organic solvent; and an inorganic nano sheet material modified by a fluoro-containing modifier and dispersed in the organic solvent, wherein the inorganic nano sheet material is in a size from 20 to 80 nm, and the organic dispersion has a solid content from 1 to 20 wt %. Further, a weight ratio of the fluoro-containing modifier in the inorganic nano sheet material to the inorganic nano sheet material is in a range from 0.06 to 1.5.

The method for preparing an organic dispersion includes the following steps (a) to (e).

In step (a), an inorganic nano sheet material is dispersed in water, to form an aqueous dispersion. In an embodiment, the inorganic nano sheet material is at least one selected from the group consisting of smectite clay, vermiculite, halloysite, mica, layered double hydroxide (LDH) and synthetic smectite clay, wherein the smectite clay is at least one selected from the group consisting of montmorillonite, saponite, beidellite, nontronite, hectorite and stevensite; and mica can be one of sericite and synthetic mica.

In step (b), the aqueous dispersion is treated with an ion-exchange resin, so as for the inorganic nano sheet material to be ion-exchanged to obtain an aqueous dispersion of an $H^+$-type inorganic nano sheet material. The ion-exchange resin is a $H^+$-type ion-exchange resin or a $OH^-$-type ion-exchange resin. Moreover, the inorganic nano sheet material is in a size from 20 to 80 nm, and has a diameter-thickness ratio of not less than 10. After being treated with an ion-exchange resin, the $H^+$-type inorganic nano sheet material is still in a size from 20 to 80 nm, and has a diameter-thickness ratio not less than 10.

In step (c), a fluoro-containing modifier is added to the aqueous dispersion of the $H^+$-type inorganic nano sheet material, to modify the inorganic nano sheet material. The structure of the fluoro-containing modifier is $(R1)_{3-n}$-Si-$\{(C_{p+q}H_{2p}F_{2q})$-$CF_3\}_{1+n}$, wherein n is an integer from 0 to 2, p and q are positive integers, and $p+q\geq 2$, and R1 is selected from -OH, -$OCH_3$, -$OC_2H_5$ and Cl.

In step (d), a first organic solvent and a second organic solvent are added to an aqueous dispersion containing the fluoro-containing modifier. In the subsequent step, the first organic solvent is first removed. Usually, the boiling point of the first organic solvent is lower than that of the second organic solvent. For example, the first organic solvent is at least one selected from the group consisting of alcohols, acetone and ethylether, and the second organic solvent is at least one selected from the group consisting of N-methyl-2-pyrrolidone (NMP), N,N-dimethylacetamide (DMAc), γ-butyrolactone (GBL), N,N-dimethylformamide (DMF), dimethyl sulfoxide (DMSO), xylene and toluene.

In step (e), the first organic solvent and water are removed, so as to disperse the modified inorganic nano sheet material in the second organic solvent to form the organic dispersion, wherein the organic dispersion has a solid content from 1 to 20 wt %, and a weight ratio of the fluoro-containing modifier in the inorganic nano sheet material to the inorganic nano sheet material is in a range from 0.06 to 1.5.

The dispersion obtained according to the previous method uses an organic solvent, which is at least one selected from the group consisting of N-methyl-2-pyrrolidone (NMP), N,N-dimethylacetamide (DMAc), β-butyrolactone (GBL), N,N-dimethylacetamide (DMF), dimethyl sulfoxide (DMSO), xylene and toluene.

In the coating composition of the present disclosure, the fluoropolymer is at least one selected from the group consisting of poly(vinylidene fluoride), poly(vinylidene fluoride-trifluorochloroethylene), poly(vinylidene fluoride-hexafluoropropylene), poly(vinylidene fluoride-chlorofluoroethylene), poly(vinylidene fluoride-chlorodifluoroethylene), poly(vinylidene fluoride-trifluoroethylene-chlorofluoroethylene), poly(vinylidene fluoride-trifluoroethylene-chlorotrifluoroethylene), poly(vinylidene fluoride-trifluoroethylene-hexafluoropropylene), poly(vinylidene fluoride-trifluoroethylene-chlorodifluoroethylene), poly(vinylidene fluoride-tetrafluoroethylene-chlorofluoroethylene), poly(vinylidene fluoride-tetrafluoroethylene-chlorotrifluoroethylene), poly(vinylidene fluoride-tetrafluoroethylene-hexapropylene) and poly(vinylidene fluoride-tetrafluoroethylene-chlorodifluoroethylene).

Moreover, in the coating composition disclosed of the present disclosure, an additive, such as a silane chain containing a different number of fluoro atoms, can be further added, in addition to the fluoropolymer, the organic solvent, and the inorganic nano sheet material modified by a fluoro-containing modifier.

Example 1

Preparation of an Organic Dispersion 25 g of montmorillonite (having an average size of 20 nm) was dispersed in 1000 g of deionized water to form a mixed solution. Ion-exchange resins, as obtained by mixing 300 g of Dowex H ion-exchange resins and 300 g of Dowex OH ion-exchange resins, were added to the mixed solution to perform an ion-exchange process, to obtain a $H^+$ mixed liquid. 0.5 g of perfluoroheptadecyltrimethoxysilane was added to the $H^+$ mixed liquid, the mixture was then reacted at 50° C. and stirred for 1 hour to obtain a modified solution. Next, 1000 g of isopropanol was added to the modified solution, which was then distilled at a reduced pressure to reach a concentration of 3 wt %. Further, 300 g of N,N-dimethylacetamide was added to the modified solution, and then the modified solution was distilled at a reduced pressure to remove isopropanol and water therefrom to obtain an organic dispersion having the modified inorganic nano sheet material. The solid content of the organic dispersion was about 3%.

Example 2

Formulation of a Fluoropolymer 50 g of poly(vinylidene fluoride) (PVDF) was dissolved in 450 g of N,N-dimethylacetamide, to obtain 10 wt % of a fluoropolymer solution.

Example 3

Preparation of a Coating Layer

The organic dispersion (having a solid content of about 3 wt %) obtained in Example 1 and the fluoropolymer solution obtained in Example 2 were used to formulate a mixture of 100 weight parts of the fluoropolymer and 5 weight parts of the inorganic nano sheet material modified by the fluoro-containing modifier. After subjecting to an ultrasonic oscillation for 2 hours, the mixture was set aside overnight. Then, the mixture was coated on a glass substrate with a spatula to form a film, and the film was baked at the conditions: 60° C. for 5 minutes, 140° C. for 10 minutes; and 210° C. for 5 minutes.

Example 4

Preparation of a Coating Layer

The steps in Example 3 were repeated, except that 7.4 g of the organic dispersion obtained in Example 1 was used to formulate a mixture of 100 weight parts of the fluoropolymer and 11 weight parts of the inorganic nano sheet material modified by the fluoro-containing modifier in this example. After subjecting to an ultrasonic oscillation for 2 hours, the mixture was set aside overnight. Then, the mixture was coated on a glass substrate with a spatula to form a film, and the film was baked at the conditions: 60° C. for 5 minutes, 140° C. for 10 minutes; and 210° C. for 5 minutes.

Example 5

Preparation of a Coating Layer

The steps in Example 3 were repeated, except that 16.67 g of the organic dispersion obtained in Example 1 was used to formulate a mixture of 100 weight parts of the fluoropolymer and 25 weight parts of the inorganic nano sheet material modified by the fluoro-containing modifier in this example. After subjecting to an ultrasonic oscillation for 2 hours, the mixture was set aside overnight. Then, the mixture was coated on a glass substrate with a spatula to form a film, and the film was baked at the conditions: 60° C. for 5 minutes, 140° C. for 10 minutes; and 210° C. for 5 minutes.

Example 6

Preparation of a Coating Layer

The steps in Example 3 were repeated, except that 2.127 g of the organic dispersion obtained in Example 1 was used to formulate a mixture of 100 weight parts of the fluoropolymer and 3 weight parts of the inorganic nano sheet material modified by the fluoro-containing modifier in this example. After subjecting to an ultrasonic oscillation for 2 hours, the mixture was set aside overnight. Then, the mixture was coated on a glass substrate with a spatula to form a film, and the film was baked at the conditions: 60° C. for 5 minutes, 140° C. for 10 minutes; and 210° C. for 5 minutes.

Example 7

Preparation of a Coating Layer

The steps in Example 1 were repeated, except that 1 g of an organic dispersion prepared with a fluoro-containing modifier was used in this example. 0.83 g of the organic dispersion was mixed with 20 g of the fluoropolymer obtained in Example 2, to formulate a mixture of 100 weight parts of the fluoropolymer and 3 weight parts of the inorganic nano sheet material modified by the fluoro-containing modifier. After subjecting to an ultrasonic oscillation for 2 hours, the mixture was set aside overnight. Then, the mixture was coated on a glass substrate with a spatula to form a film, and the film was baked at the conditions: 60° C. for 5 minutes, 140° C. for 10 minutes; and 210° C. for 5 minutes.

Example 8

Preparation of a Coating Layer

The steps in Example 1 were repeated, except that 0.9 g of an organic dispersion prepared with a fluoro-containing modifier was used in this example. 5.4 g of the organic dispersion was mixed with 20 g of the fluoropolymer obtained in Example 2, to formulate a mixture of 100 weight parts of the fluoropolymer and 8.1 weight parts of the inorganic nano sheet material modified by the fluoro-containing modifier. After subjecting to an ultrasonic oscillation for 2 hours, the mixture was set aside overnight. Then, the mixture was coated on a glass substrate with a spatula to form a film, and the film was baked at the conditions: 60° C. for 5 minutes, 140° C. for 10 minutes; and 210° C. for 5 minutes.

Example 9

Preparation of a Coating Layer

The steps in Example 1 were repeated, except that 1.5375 g of an organic dispersion prepared with a fluoro-containing modifier was used in this example. 5.4 g of the organic dispersion was mixed with 20 g of the fluoropolymer obtained in Example 2, to formulate a mixture of 100 weight parts of the fluoropolymer and 8.1 weight parts of the inorganic nano sheet material modified by the fluoro-containing modifier. After subjecting to an ultrasonic oscillation for 2 hours, the mixture was set aside overnight. Then, the mixture was coated on a glass substrate with a spatula to form a film, and the film was baked at the conditions: 60° C. for 5 minutes, 140° C. for 10 minutes; and 210° C. for 5 minutes.

Example 10

Preparation of a Coating Layer

The steps in Example 1 were repeated, except that 2.5 g of an organic dispersion prepared with a fluoro-containing modifier was used in this example. 5.4 g of the organic dispersion was mixed with 20 g of the fluoropolymer obtained in Example 2, to formulate a mixture of 100 weight parts of the fluoropolymer and 8.1 weight parts of the inorganic nano sheet material modified by the fluoro-containing modifier. After subjecting to an ultrasonic oscillation for 2 hours, the mixture was set aside overnight. Then, the mixture was coated on a glass substrate with a spatula to form a film, and the film was baked at the conditions: 60° C. for 5 minutes, 140° C. for 10 minutes; and 210° C. for 5 minutes.

A Table Summarizing the Components in Examples

| | Weight parts of PVDF | Weight parts of the fluoro-containing modifier | Weight parts of the inorganic nano sheet material | Weight ratio of the fluoro-containing modifier to the inorganic nano sheet material |
|---|---|---|---|---|
| Example 3 | 100 | 2 | 5 | 0.4 |
| Example 4 | 100 | 2 | 11 | 0.18 |
| Example 5 | 100 | 2 | 25 | 0.08 |
| Example 6 | 100 | 2 | 3 | 0.66 |
| Example 7 | 100 | 4 | 3 | 1.33 |
| Example 8 | 100 | 3.6 | 8.1 | 0.44 |
| Example 9 | 100 | 6.15 | 8.1 | 0.759 |
| Example 10 | 100 | 10 | 8.1 | 1.23 |

Test Examples

The brightness, transmittance and haziness tests were performed according to ASTM D1003.

The test for a yellowing value was performed according to ASTM D1925.

The test for a dielectric constant and dielectric strength was performed according to ASTM D150.

The test for a breakdown voltage was performed according to ASTM D149.

The test for a contact angle was performed according to ASTM D7334-08.

The test results were shown in Tables 1 to 5, respectively.

TABLE 1

| | Thickness (nm) | Brightness | Yellowing value | Transmittance at 550 nm | Haziness |
|---|---|---|---|---|---|
| PVDF (note 1) | 20 | 85.12 | 1.28 | 72.43% | 23.32 |
| PVDF clay 3 to 20% (note 2) | 20 | >96 | <2 | >93% | <1 |
| Coating layer of Example 3 | 11 | 97.07 | 0.23 | 94.19% | <1 |
| Coating layer of Example 4 | 18 | 97.07 | 0.34 | 94.21% | <1 |
| Coating layer of Example 5 | 20 | 96.72 | 0.51 | 93.55% | <1 |

(note 1):
only the fluoropolymer solution of Example 2 was used to form coating layers.

(note 2):
PVDF clay 3 to 20% represented a composition formulated according to Examples 1 and 2, except that the composition did not contain the fluoro-containing modifier, and the content of the inorganic nano sheet material was adjusted to 3 to 20% of the weight of the composition.

TABLE 2

| | Thickness | Dielectric constant @1 KHz | Disruptive voltage | Dielectric strength (V/μm) |
|---|---|---|---|---|
| PVDF clay 3 to 20% | 17 μm | 8.27 | 1.51 kV | 88.82 |
| Coating layer of Example 3 | 20 μm | 8.5 | 1.93 kV | 96.67 |
| Coating layer of Example 4 | 19 μm | 8.7 | 1.62 kV | 85.09 |
| Coating layer of Example 5 | 20 μm | 9.42 | 1.60 kV | 80.00 |

TABLE 3

| Puncture voltage by water droplets | SiNx | Coating layer of example 6 |
|---|---|---|
| Positive voltage (V) | 175 | 96 |
| Negative voltage (V) | −30 | −84.5 |

TABLE 4

| | Average value of contact angles |
|---|---|
| PVDF (Note 1) | 91.65 |
| PVDF-3%-clay (Note 3) | 85.42 |
| PVDF-11%-clay (Note 3) | 80.40 |
| PVDF-25%-clay (Note 3) | 80.16 |
| Coating layer of Example 6 | 100.80 |
| Coating layer of Example 7 | 115.25 |
| Coating layer of Example 8 | 112.25 |
| Coating layer of Example 9 | 116.6 |
| Coating layer of Example 10 | 117.1 |

(Note 1):
only the fluoropolymer solution of Example 2 was used to form a coating layer.
(Note 3):
PVDF-3%-clay, PVDF-11%-clay and PVDF-25%-clay represented compositions formulated according to Examples 1 and 2, except that the compositions did not incldue the fluoro-containing modifier, and the inorganic nano sheet materials were adjusted to be 3%, 11% and 25% of the weights of the compositions, respectively.

TABLE 5

| | Thickness | Average transmittance (400 to 700 nm) (%) | Average reflectance (400 to 700 nm) (%) |
|---|---|---|---|
| Glass (blank group), | — | 90.91 | 9.62 |
| PVDF-5%-clay (Note 4) | 94.6 nm | 92.00 | 8.62 |
| Example 3 | 96.6 nm | 93.39 | 6.93 |

(Note 4):
PVDF-5%-clay represented a composition formulated according to Examples 1 and 2, except that the composition did not contain the fluoro-containing modifier, and the inorganic nano sheet material was adjusted to be 5% of the weight of the composition.

According to aforesaid test examples, the coating layers formed by the coating compositions of the present disclosure had higher transmittances, lower yellowing values, excellent insulating properties, high puncture voltages by water droplets and greater contact angles, such that they are particularly suitable to be used in hydrophobic insulating layers and applicable in electronic products with optical demands.

The above examples are only used to illustrate the principle of the present disclosure and the effect thereof, and should not be construed as to limit the present disclosure. The above examples can all be modified and altered by those skilled in the art, without departing from the spirit and scope of the present disclosure as defined in the following appended claims.

The invention claimed is:

1. An organic dispersion, comprising:
   an organic solvent; and
   an inorganic nano sheet material modified by a fluoro-containing modifier and dispersed in the organic solvent, wherein the modified inorganic nano sheet material is at least one selected from the group consisting of smectite clay, vermiculite, halloysite, mica, layered double hydroxide (LDH) and synthetic smectite in a size from 20 to 80 nm, and the organic dispersion has a solid content from 1 to 20 wt %, and a weight ratio of the fluoro-containing modifier in the modified inorganic nano sheet material to the modified inorganic nano sheet material is in a range from 0.06 to 1.5, wherein the fluoro-containing modifier has a structure of $(R1)_{3-n}$-Si—$\{(C_{p+q}H_{2p}F_{2q})-CF_3\}_{1+n}$, in which n is an integer of from 0 to 2, p and q are positive integers, p+q≥2, and R1 is selected from the group consisting of —OH, —OCH$_3$, —OC$_2$H$_5$ and —Cl.

2. The organic dispersion of claim 1, wherein the organic solvent is at least one selected from the group consisting of N-methyl-2-pyrrolidone (NMP), N,N-dimethylacetamide (DMAc), γ-butyrolactone (GBL), N,N-dimethylformamide (DMF), dimethyl sulfoxide (DMSO), xylene and toluene.

3. The organic dispersion of claim 1, wherein the inorganic nano sheet material has a diameter-thickness ratio not less than 10.

* * * * *